United States Patent
Vermola (10) Patent No.: US 8,095,958 B2
(45) Date of Patent: Jan. 10, 2012

(54) SYSTEM AND METHOD FOR LOCATION-APPROPRIATE SERVICE LISTINGS

(75) Inventor: Larri Vermola, Turku (FI)

(73) Assignee: Nokia Corporation, Espoo (FI)

( * ) Notice: Subject to any disclaimer, the term of this patent is extended or adjusted under 35 U.S.C. 154(b) by 1143 days.

(21) Appl. No.: 10/879,916

(22) Filed: Jun. 29, 2004

(65) Prior Publication Data

US 2005/0289589 A1 Dec. 29, 2005

(51) Int. Cl.
*G06F 3/00* (2006.01)
*G06F 13/00* (2006.01)
*H04N 5/445* (2011.01)
*H04N 7/173* (2011.01)

(52) U.S. Cl. .......................... 725/131; 725/59; 725/105

(58) Field of Classification Search .................. 725/35, 725/59, 62, 106, 132, 152, 105, 131, 134
See application file for complete search history.

(56) References Cited

U.S. PATENT DOCUMENTS

| | | | |
|---|---|---|---|
| 6,108,365 A * | 8/2000 | Rubin et al. ............... 375/130 | |
| 6,172,674 B1 | 1/2001 | Etheredge | |
| 6,861,984 B2 * | 3/2005 | Rabinowitz et al. .......... 342/464 | |
| 6,981,273 B1 * | 12/2005 | Domegan et al. .............. 725/39 | |
| 7,194,756 B2 * | 3/2007 | Addington et al. ............ 725/116 | |
| 2003/0153264 A1 * | 8/2003 | Osato et al. .................. 455/3.06 | |
| 2003/0229900 A1 * | 12/2003 | Reisman .......................... 725/87 | |
| 2004/0261126 A1 | 12/2004 | Addington et al. | |
| 2005/0136946 A1 * | 6/2005 | Trossen et al. ............. 455/456.2 | |
| 2005/0143095 A1 * | 6/2005 | Jacob ........................... 455/456.3 | |
| 2005/0183126 A1 * | 8/2005 | Murao et al. ................... 725/75 | |
| 2006/0020525 A1 * | 1/2006 | Borelli et al. ................... 705/34 | |

FOREIGN PATENT DOCUMENTS

| | | |
|---|---|---|
| JP | 5083648 | 4/1993 |
| JP | 11284930 A | 10/1999 |
| KR | 10-0905008 | 6/2009 |
| WO | WO 03/045064 A1 | 5/2003 |

OTHER PUBLICATIONS

PCT International Search Report, International Application No. PCT/IB2005/001817, Date of Completion of Search—Oct. 17, 2005.
Mexican Office Action (Partial translation in English provided), PA/a/2006/014815, Jul. 3, 2009, pp. 1-3, Mexico.
Mexican Office Action for corresponding MX Application No. PA/a/2006/014815, Oct. 7, 2009, Mexico.
Mexican Office Action (Partial translation in English provided), PA/a/2006/014815, Jan. 28, 2010, pp. 1-4, Mexico.
Chinese Office action of corresponding CN App. No. 200580021813.8 dated May 23, 2008, pp. 1-13.

(Continued)

*Primary Examiner* — Kristine Kincaid
*Assistant Examiner* — John Schnurr
(74) *Attorney, Agent, or Firm* — Ditthavong Mori & Steiner, P.C.

(57) ABSTRACT

Systems and methods applicable, for example, in the provision of service listings, channel listings, and/or the like. The location of a device may, for example, be determined, and one or more service parameters corresponding, for instance, to the location may, for example, be employed in receiving service listings data, channel listings data, and/or the like.

23 Claims, 7 Drawing Sheets

OTHER PUBLICATIONS

Chinese Office action of corresponding CN App. No. 200580021813.8 dated May 24, 2010, pp. 1-6.
Mexican Office Action of corresponding MX App. No. PA/a/2006/014815 dated Apr. 15, 2010, Mexico, pp. 1-3.
Chinese Office action of corresponding CN App. No. 200580021813.8 dated Jan. 12, 2011, pp. 1-13.
European Office action for corresponding EP application No. 05 757 379.2-2223 dated Mar. 10, 2011, pp. 1-4.
International preliminary report on patentability for corresponding international application No. PCT/IB2005/001817 dated Jan. 9, 2007, pp. 1-6.
International search report and written opinion for corresponding international application No. PCT/IB2005/001817 dated Oct. 25, 2005, pp. 1-7.

* cited by examiner

Fig. 1

| GENERATED LOCATION INFORMATION | SERVICE PROVIDER | SERVICE AREA | CHANNEL PACKAGE | PREFERRED CHANNEL ORDER |
|---|---|---|---|---|
| Home area | FCO | Capital Area | All national channels; Two regional channels; One local channel | TV1; XTV; ZZTV; TV5; RTV1; RTV3; CVT2 |
| Summer cottage | FCO | Lake District | All national channels; Two regional channels | TV1; XTV; WXZ1; WXZ2; TV5 |
| Berlin | DCO | Berlin City | Two national channels; Three regional channels; Two local channels | BTV1; BTV3; BTV4; DTV3; DDTV; ZOO1, AXL |
| Branch office in London City | BCO | London Metropolitan | Two national channels; Three regional channels | CYTV; LTV1; LTV2; GBT1; SCTV |
| London Heathrow airport | BCO | London Heathrow | Two national channels; One local channel | AIRTV; CYTV; GBT1 |
| Paris De Gaulle airport | FRCO | | One national channel; One local channel | DGTV; TV5 |
| Paris | FRCO | Paris Metropolitan | Two national channels; One local channel | TV5; TV1; PTV |
| | ICO | Rome Metropolitan | Two national channels; One local channel | |
| Villa | ICO | Tuscany, Italy | Two national channels; One local channel | |

SYSTEM AND METHOD FOR LOCATION-APPROPRIATE SERVICE LISTINGS

FIELD OF INVENTION

This invention relates to systems and methods for service listings.

BACKGROUND INFORMATION

In recent years, there has been an increase in receivable programming.

For instance, a wide variety of programs (e.g., video programs, audio programs, and interactive programs) may be received via, for example, Amplitude Modulation (AM) radio, Frequency Modulation (FM) radio, Digital Audio Broadcast (DAB), Digital Radio Mondial (DRM), Digital Video Broadcast (DVB), satellite radio, satellite television, National Television System Committee (NTSC) television, Phase Alternating Ling (PAL) television, and the Internet.

Accordingly, there may be interest in technologies that facilitate the use of such programs.

SUMMARY OF THE INVENTION

According to various embodiments of the present invention, there are provided systems and methods applicable, for example, in the provision of service listings, channel listings, and/or the like.

In various embodiments, the location of a device may be determined, and one or more service parameters corresponding, for instance, to the location may, for example, be employed in receiving service listings data, channel listings data, and/or the like.

DETAILED DESCRIPTION OF THE INVENTION

General Operation

According to various embodiments of the present invention, there are provided systems and methods applicable, for example, in the provision of service listings, channel listings, and/or the like.

In various embodiments, the location of a device may be determined, and one or more service parameters corresponding, for instance, to the location may, for example, be employed in receiving service listings data, channel listings data, and/or the like appropriate, for instance, to the location, one or more subscriptions, packages, and/or the like of a user, and/or the like.

Moreover, in various embodiments a graphical user interface (GUI), and/or other interface may be employed in presenting service listings, channel listings, and/or the like corresponding, for instance, to some or all of the service listings data, channel listings data, and/or the like.

Various aspects of the present invention will now be discussed in greater detail.

Service Parameter Operations

Figure 1:
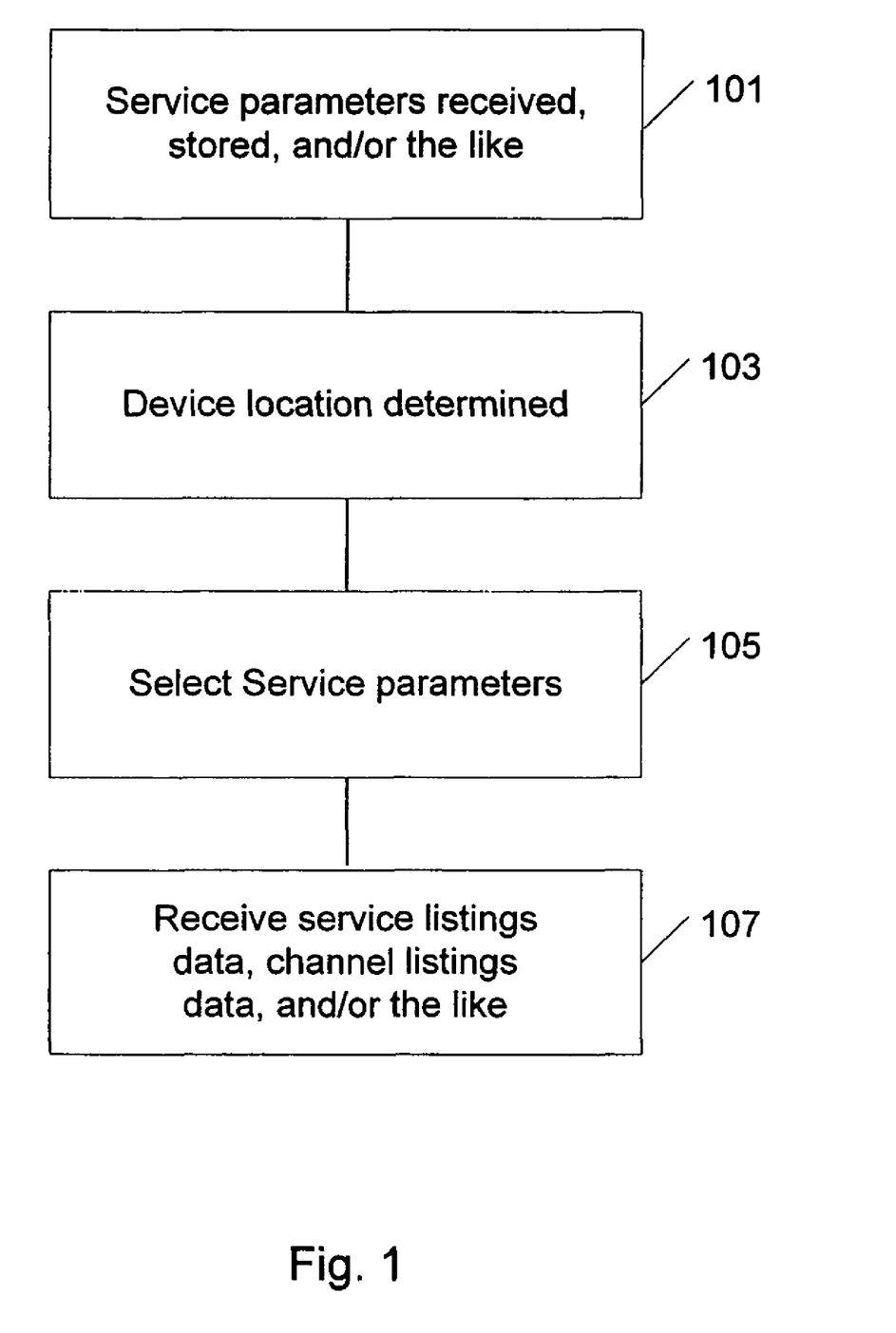
FIG. 1 shows exemplary steps involved in service parameter operations and location-appropriate service listings data, channel listings data, and/or the like operations according to various embodiments of the present invention.

With respect to FIG. 1 it is noted that service parameters corresponding to one or more locations, service areas, and/or the like may, according to various embodiments, be received, stored, and/or the like (step 101). Accordingly, for example, service parameters corresponding to one or more home service areas, locations, and/or the like, corresponding to one or more non-home service areas, locations, and/or the like, and/or the like may be received.

A device may, according to various embodiments of the present invention, come to possess service parameters in various ways. In one exemplary embodiment, the device receives the service parameters from a service provide at its current location, for example via IPDC or a cellular network. Additionally, the local service provider receives service parameters for other service providers and may also collect them into one list of service parameters and transmit them to the device (the network of service providers can communicate over any known means to exchange service parameters, for example they may communicate service parameters over a wireline network).

For instance, the device may receive, store, and/or the like service parameters prior to receiving one or more programs and/or the like (e.g., video, audio, and/or interactive programs), while receiving one or more programs and/or the like, prior to (e.g., for the first time) roaming, leaving a home service area, and/or the like, while in a particular service area (e.g., a home service area, a non-home service area, and/or the like), and/or the like.

It is noted that, in various embodiments, a device may come to possess one or more service parameters by way of being set to operate in a certain area and/or the like. For example, in the case where a device has been set up to receive, for instance, service listings data, channel listings data, and/or the like with respect to a particular service area, location, and/or the like the device, perhaps automatically and/or in response to a request by its user, may act to store corresponding service parameters. Such corresponding service parameters could, for example, be later recalled when the device returned to that service area, location, and/or the like. Additionally, when connected to receive service listings the device may receive service parameters also for other service areas as well. The other service areas may be part of user's service subscription, e.g. other areas of a related service provider's service coverage, or they could be roaming services from other service providers. The other service parameters may later be used when the device moves to other service areas, locations, and/or the like.

Receipt of service parameters may, for example, involve Internet Protocol Datacast (IPDC) (e.g., receipt of an IPDC data stream), Universal Mobile Telecommunications Service (UMTS), General Packet Radio Service (GPRS), Short Message Service (SMS), Multimedia Messaging Service (MMS), email, Simple Object Access Protocol (SOAP), Java Messaging Service (JMS), Remote Method Invocation (RMI), Multimedia Broadcast and Multicast Service (MBMS), Digital Video Broadcast (DVB) (e.g., terrestrial digital video broadcast (DVB-T), Digital Video Broadcasting: Handhelds (DVB-H), Satellite Digital Video Broadcast (DVB-S), and/or the like), Digital Audio Broadcast (DAB), Digital Radio Mondial (DRM), Internet Protocol (IP), Amplitude Modulation (AM) radio, Frequency Modulation (FM) radio (e.g., via FM subcarrier), Radio Data Service (RDS), satellite radio, television, digital television, satellite television, National Television System Committee (NTSC) television, Phase Alternating Line (PAL) television, and/or the like (e.g., via blanking interval and/or the like), and/or the like. In various embodiments, one or more service parameters may be received via receipt of one or more Network Information Tables (NITs) and/or the like.

It is noted that, in various embodiments, a device may come to possess one or more service parameters from connection with one or more service providers via one or more networks or services. For example, a device may receive service listings data, channel listings data, and/or the like regardless of its particular service area, location, and/or the like. The device, perhaps automatically and/or in response to a request by its user, stores the received service parameters for multiple areas/locations. Such service parameters could, for example, be later recalled when the device moves to a specific service area, location, and/or the like. The service providers may provide service parameters for one or more services, and may additionally provide service listings data related to each set of service parameters. In addition, the service providers may provide one or more of the services presented in the service listings data. These networks or services could be any of the examples described in the previous paragraph.

In order to receive the service parameters, in the various embodiments, a device might set its tuner to a particular frequency, associate itself with a multicast address (e.g., an IP multicast address), access data from a particular network address (e.g., an IP address), and/or the like.

Various data could be included in service parameters. For instance, included could be, perhaps for one or more service areas, available service information, channel information, and/or the like (perhaps corresponding to one or more subscriptions, packages, and/or the like), service area information (e.g., geographical coverage area information, service area identifiers, and/or the like), channel, service, and/or the like orders (e.g., orders for channel, service, and/or the like display in service listings, channel listings, and/or the like), service provider descriptions (e.g., service provider names, identifiers, and/or the like), frequencies, network IP addresses, IP multicast addresses and/or the like for receipt service listings data, channel listings data, and/or the like, network parameters (e.g., network identifiers, network names, NIT versions, signal lists, platform lists, and/or the like), platform parameters (e.g., platform identifiers, platform names, and/or the like), routing table parameters (e.g., routing table lists, identifiers, and/or the like), signal parameters, cell identifiers, tuning parameters, transport stream identifiers, identifiers for subscriptions, packages, user preferences such as preferred channel order, and/or the like, and/or the like.

In various embodiments, various service parameters may be associated with generated location information, and/or generated location information may be stored as one or more service parameters, along with service parameters, and/or the like. For instance, generated location information might be stored, perhaps as one or more service parameters, along with one or more service parameters possessed by way of a device being set to operate in a certain area.

Such generated location information might be generated in a number of ways. For example, in various embodiments, in the case where a device travels to a particular location, one or more names for the location, positioning information, and/or the like may be stored as generated location information. The positioning information might, for example, be specified in terms of one or more latitude/longitude indications, distance indications, and/or the like, be based on device location determined in a manner analogous to that discussed above (e.g., Global Positioning Service (GPS)), be provided by a user (e.g., via GUI and/or other interface), and/or the like. The one or more names, preferably meaningful to a user, might, for instance, be provided manually by a user via a GUI and/or other interface. It is noted that, in various embodiments, in the case where a device does not travel to a particular location, generated location information might not be automatically generated for that location with respect to that device.

Figure 2:
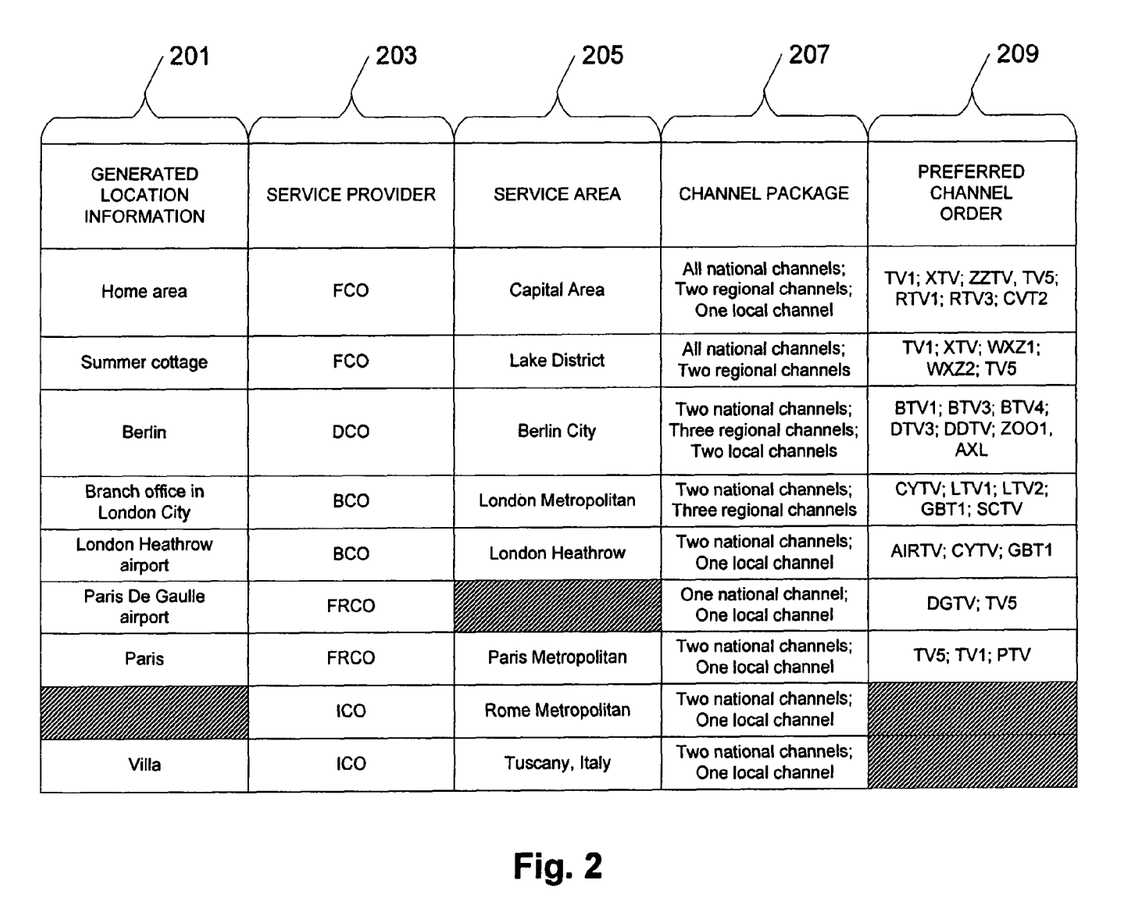
FIG. 2 shows exemplary service parameters according to various embodiments of the present invention.

Shown in FIG. 2 are various exemplary service parameters including generated location information (see column 201), service provider names (see column 203), service area information (see column 205), channel package information (see column 207), and channel order information (see column 209). The service parameters of FIG. 2 might, for instance, be held in a store accessible by a particular device.

The service provider names may further include information or parameters for contacting, receiving or accessing the service provider, for example frequencies, network IP addresses, IP multicast addresses, etc.

The service area information may further include information or parameters describing the coverage area of a specific service area, specified in terms of one or more latitude/longitude indications, distance indications, and/or the like.

The channel package information may further include information or parameters on available channels, for example channel names, channel indicators, user access rights, user service subscription. It may additionally include frequencies, network IP addresses, IP multicast addresses, etc. for contacting, accessing or receiving a particular channel, program or service.

The channel order information might, for instance, be set by a user, system administrator, manufacturer, service provider, and/or the like, and/or the like. The channel order information may further include information or parameters describing user's preferences, for example, the preferred display order of channels or services, or user interface look appearance.

In an exemplary embodiment, IPDC is used for transmission of service listings data and actual services, channels or programs, channels or programs selected from the service listings data, the service provider field or name may include information or parameters for tuning the receiver device to the frequency of the service provider. In this case, the IPDC transmission is time sliced (such as DVB-H) and the receiver device buffers the decoded transmission before presentation. In addition, the service listings data may be transmitted via IPDA data stream, while the channels, services or programs are transmitted via IPDC video and audio streams. Service parameters may also be transmitted via IPDA data stream. Further, the channel package information may include information or parameters providing IP multicast addresses of available channels, services or programs and for adjusting the receiver device to receive and decode a selected channel, service or program.

In the example of FIG. 2, service parameters in a given row are associated with one another. Accordingly, for instance, the row including the service area information "Lake District" contains service parameters corresponding to the "Lake District" service area for service provider "FCO". With respect to this exemplary row, it is noted that generated location information "summer cottage" has been associated with the other service parameters of the row.

With further respect to FIG. 2 it is noted that the hashed box in the exemplary row including "Rome Metropolitan" indicates, in this example, a lack of generated location information with respect to the service parameters of the row. Such a situation might arise, for instance, when a user of the device has not entered any location information, where the device has not traveled to the location, where the user has not used the services of the service provide in that area, and/or the like. For example, generated location information and channel order information are, optionally, not received from the service provider with other service parameters.

Additionally with respect to FIG. 2, it is noted that the hashed box in the exemplary row including "Paris De Gaulle Airport" indicates, in this example, a lack of service area information with respect to the service parameters of the row.

Such a situation might arise, for example, in the case where a service area is not known, defined, and/or the like in its entirety. As another example, such a situation might arise in the case where the device does not receive some or all of information regarding the service area (e.g., where the device comes to possess one or more service parameters by way of being set to operate in a certain area as discussed above, does not receive an indication of the coverage area, receives an incomplete indication of the coverage area, and/or the like).

As yet another example, such a situation might arise in the case where one or more service parameters were and/or were not received from one or more particular service providers, while in and/or not in one or more particular service areas, and/or the like (e.g., where one or more service parameters were not received from the service provider serving the service area, were received while not in the service area, and/or the like). As still another example, such a situation might arise in the case where one or more service parameters were received while receiving one or more programs and/or the like in the service area (e.g., where the service area is a non-home service area), and/or the like.

In another variation to the disclosed system, embed cursory service information is included along with one or more of the service parameters (e.g. service provider 203 or channel package 207). Beneficially, this provides the device with information sufficient to tune or set the device, based on its location, to receive content without requesting the actual detailed service listings. This enables a fast access to content for the user upon receipt of the service parameters.

It is noted that, in various embodiments, a device may act to provide one or more service parameters to another device.
Location-Appropriate Service Listings Data, Channel Listings Data, and/or the Like Operations In various embodiments location-appropriate service listings data, channel listings data, electronic program guide (EPG), electronic service guide (ESG), interactive service guide (ISG), and/or the like may be received, stored, and/or the like, for instance, for purposes of providing location-appropriate service listings, channel listings, and/or the like.

With further respect to FIG. 1 it is noted that, in acting to receive such service listings data, channel listings data, and/or the like, the location of a device may, in various embodiments, be determined (step 103). Such functionality may be implemented in a number of ways.

For example, a user might be prompted for the location of the device (e.g., via a GUI and/or other interface provided by the device). As another example, GPS might be employed (e.g., GPS circuitry might be incorporated into the device) or any other positioning device.

As yet another example, cell and/or other network information might be employed (e.g., one or more cell and/or network identifiers might—perhaps by consulting an accessible store that associated such identifiers with geographical locations—be received and used to determine the device's location, geographical data might be received from cell and/or network equipment, and/or the like). As further examples, triangulation techniques could be employed, timing techniques could be employed, and/or the like.

The location of a device might, in various embodiments, be determined at one or more junctures, times, intervals, and/or the like. For instance, location determination might be performed upon the device being powered up, periodically (e.g., in accordance with a schedule and/or the like provided by a user, system administrator, manufacturer, service provider, and/or the like), when the device changes networks, cells, manually by a user, and/or the like, and/or the like.

With the location of a device known, one or more operations could be performed to select from service parameters (e.g., service parameters held in an accessible store), the service parameters to be employed in the receipt of location-appropriate service listings data, channel listings data, and/or the like (step 105). Such functionality could be implemented in a number of ways.

For example, in various embodiments various service parameters could be associated with locations (e.g., geographical locations and/or the like), generated location information, service area coverage areas, and/or the like. Various such information might, perhaps, be specified in terms of one or more latitude/longitude indications, distance indications, and/or the like.

Accordingly, in various embodiments, the known location of the device could be employed in retrieving, accessing, and/or the like various corresponding service parameters employable in the receipt of location-appropriate service listings data, channel listings data, and/or the like. It is noted that, in various embodiments, determination might be made as to one or more service areas corresponding to the device's location, i.e. comparing determined location information with service area parameters. For example, when the device leaves its current broadcasting service location it would compare its current location with its stored location information and choose the service parameters accordingly. Once the new location is determined, the device uses the service parameters to query the new service provider for service listing data, for example via the cellular network or over IPDC.

Alternatively, the user may manually select and identify the current location based on a list of available locations. The list could be generated by using the generated location information (201). The user would then be left to select the appropriate location from the list.

Service parameters employable in the receipt service listings data, channel listings data, and/or the like could include, for instance, frequencies, network addresses, and/or the like, information regarding one or more subscriptions, packages, and/or the like (e.g., of the device's user), and/or the like.

The selected service parameters are then used to format and send a request for a service listing to a service provider (step 106). The service provider may be different that originally provided the service parameters.

Receipt of the service listings data, channel listings data, and/or the like using the appropriate service parameters (step 107) could, in various embodiments, involve IPDC, UMTS, GPRS, SMS, MMS, email, SOAP, JMS, RMI, MBMS, DVB (e.g., DVB-T, DVB-H, DVB-S, and/or the like), DAB, DRM, IP, AM radio, FM radio (e.g., via FM subcarrier), satellite radio, satellite television, NTSC television, PAL television, and/or the like (e.g., via blanking interval and/or the like), and/or the like. For instance, in various embodiments, an IPDC data stream might be received, a device tuner might be set to a particular frequency, the device might access data from a particular network address (e.g., an IP address), the device might associate itself with a multicast address (e.g., an IP multicast address), and/or the like.

Once the service listings are received, the service listings may be optionally customized. For instance, the presentation of the service listings might be manually set by the user or they may be formatted according to preset preferences. If the customization information already exists it may be utilized when presenting the service listings. Similarly, the user might name the location or the system might set a default name based on some set of parameters (e.g. the current location of the user as determined by the device).

It is noted that, in various embodiments, received service listings data, channel listings data, and/or the like could be placed by the device in an associable store. It is further noted that, in various embodiments, a device may act to provide service listings data, channel listings data, and/or the like to another device.

Figure 3:
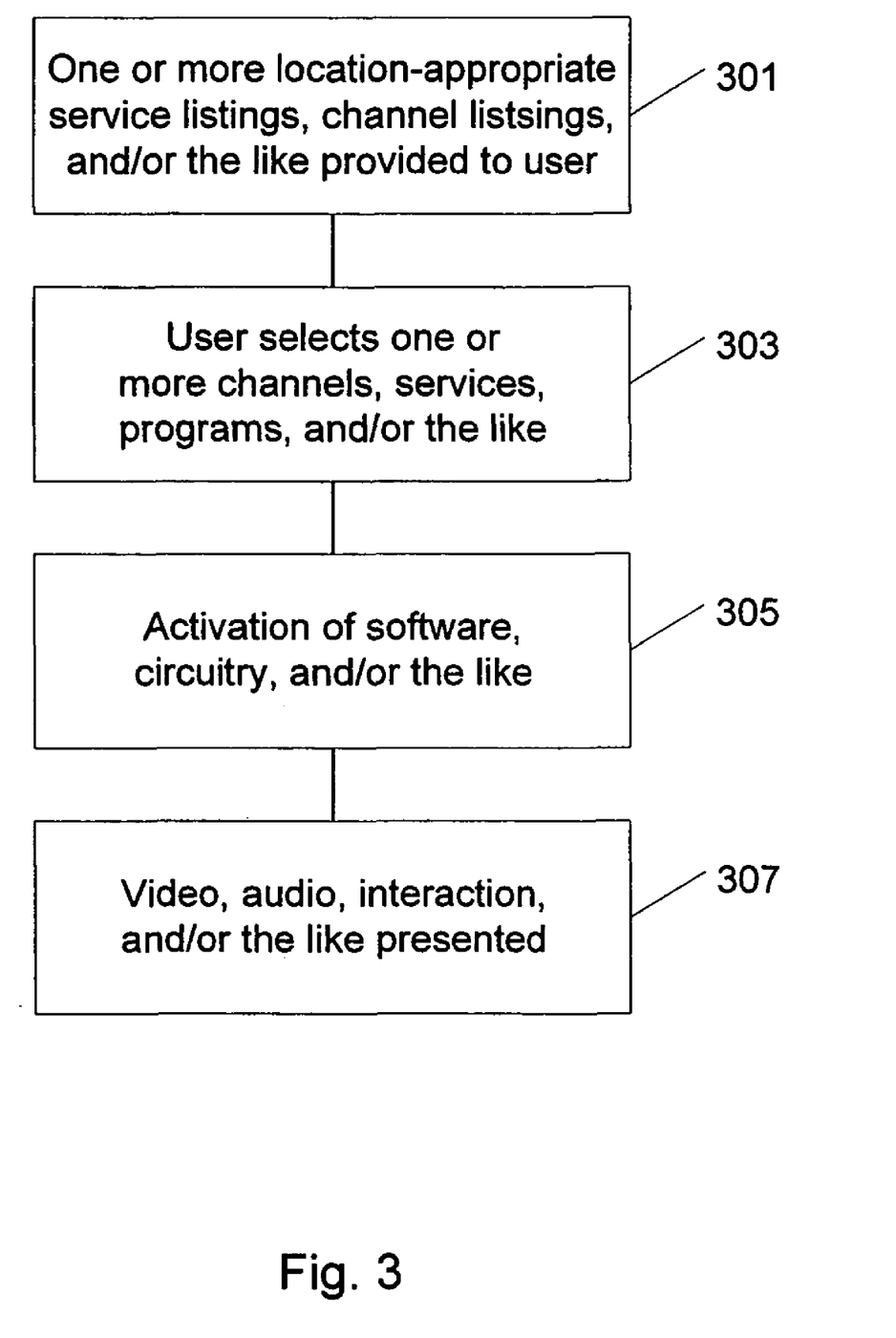
FIG. 3 shows exemplary steps involved in provision of location-appropriate service listings, channel listings, and/or the like according to various embodiments of the present invention.

Provision of Location-Appropriate Service Listings, Channel Listings, and/or the Like With respect to FIG. 3 it is noted that, according to various embodiments of the present invention, one or more location-appropriate service listings, channel listings, and/or the like, corresponding, for instance, to some or all of received location-appropriate service listings data, channel listings data, and/or the like, may be provided to a user (step 301).

Such functionality may be implemented in a number of ways. For example, the user may be presented with one or more service listings, channel listings, and/or the like in the form of one or more GUIs, grids, and/or other interfaces displaying information about one or more available programs and/or the like (e.g., video, audio, and/or interactive programs), perhaps with respect to one or more particular time periods. Such a time period might, for example, be specified by the user, correlate to a current time, and/or the like. In various embodiments, indication of one or more available services, channels, and/or the like might be provided via the GUIs, grids, and/or other interfaces, with indication of one or more available programs and/or the like being presented for each service, channel, and/or the like.

Accordingly, in various embodiments, a user may, for instance, receive display of one or more service listings, channel listings, and/or the like corresponding to her device's present location.

Figure 4:
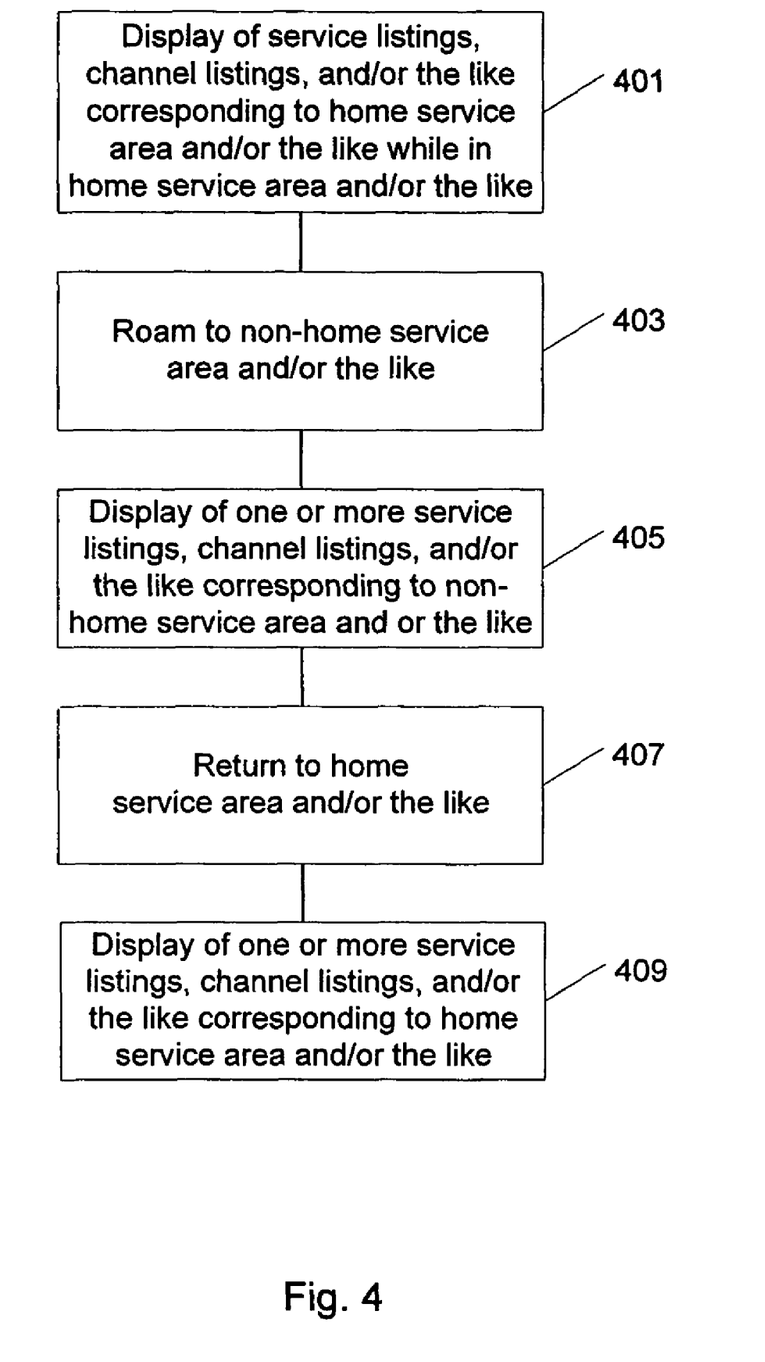
FIG. 4 shows further exemplary steps involved in provision of location-appropriate service listings, channel listings, and/or the like according to various embodiments of the present invention.

With respect to FIG. 4 it is noted that thus, the user could, for instance, receive display of one or more service listings, channel listings, and/or the like corresponding to a home service area and/or the like while in that home service area and/or the like (step 401), then having roamed to a non-home service area and/or the like (step 403), receive display of one or more service listings, channel listings, and/or the like corresponding to the non-home service area and/or the like (step 405), and then having returned to the home service area and/or the like (step 407), again receive display of one or more service listings, channel listings, and/or the like corresponding to the home service area and/or the like (step 409).

In various embodiments, the GUIs, grids, and/or other interfaces might act to display only channels, services, programs, and/or the like available in accordance with one or more subscriptions, packages, and/or the like of the user. It is noted that, in various embodiments, access to one or more channels, services, programs, and/or the like via one or more subscriptions, packages, and/or the like of the user may be location dependent. Accordingly, for example, one or more subscriptions, packages, and/or the like of the user may allow her to access certain channels, services, programs, and/or the like in one location, service area, and/or the like (e.g., a home service area) while allowing her access to certain other and/or different channels, services, programs, and/or the like in another location, service area, and/or the like (e.g., a non-home service area).

Moreover, it is noted that, in various embodiments, one or more subscriptions, packages, and/or the like of a user may allow for one or more national, local, and/or regional channels, services, and/or the like, for roaming to one or more non-home service areas and/or the like, and/or the like.

A GUI, grid, and/or other interface might, in various embodiments, present channels, services, and/or the like in a particular order in accordance with, for example, one or more, perhaps received, service parameters. Such an order might, for example, be set by a user, system administrator, manufacturer, service provider, and/or the like. In various embodiments, in the case where such order is set by a user, the user might be able to indicate desired order via a GUI and/or other interface, and recordation of the desired order might be stored, for example, as one or more service parameters, along with service parameters, and/or the like. In various embodiments, functionality regarding various preferences could be implemented in an analogous manner.

With further respect to FIG. 3 it is noted that a user may, in various embodiments, be able to search among available channels, services, programs, and/or the like, be able to select one or more channels, services, programs, and/or the like for receipt, recording, use, and/or the like, and/or the like (step 303). Accordingly, for instance, selection (e.g., via a provided GUI, grid, and/or other interface) of a particular program and/or the like indicated as available by a service listing, channel listing, and/or the like may result in the activation of software, circuitry, and/or the like (step 305) whereby, for example, video, audio, interaction, and/or the like may be presented (step 307).

Receipt, recording, use, and/or the like of a program and/or the like may, in various embodiments, involve IPDC, UMTS, GPRS, SMS, MMS, email, SOAP, JMS, RMI, MBMS, DVB (e.g., DVB-T, DVB-H, DVB-S, and/or the like), DAB, DRM, IP, AM radio, FM radio, satellite radio, satellite television, NTSC television, PAL television, and/or the like.

It is noted that, in various embodiments, service listings, channel listings, and/or the like may be able to support various hierarchies (e.g., service hierarchies, session hierarchies, and/or the like).

Device Operations

In various embodiments of the present invention, one or more devices may be involved in various of the operations discussed herein.

For example, in various embodiments of the present invention a user device (e.g., a wired or wireless node and/or other computer, a television receiver, a radio receiver, and/or the like) may receive, store, and/or the like service parameters, receive, store, and/or the like location-appropriate service listings data, channel listings data, and/or the like, and provide one or more location-appropriate service listings, channel listings, and/or the like to a user.

As another example, in various embodiments certain of the operations discussed above may be performed by a devices such as one or more servers and/or other computers, and/or the like, while others of the operations discussed herein may be performed by a user device.

For example, in various embodiments one or more servers and/or other computers, and/or the like might act to receive, store, and/or the like service parameters, to receive, store, and/or the like location-appropriate service listings data, channel listings data, and/or the like, and to provide some or all of the service parameters and the service listings data, channel listings data, and/or the like to a user device. The user device could, in turn, provide location-appropriate service listings, channel listings, and/or the like to a user. Determination of the location of the user device might, for instance, be performed by both or either of the user device and the one or more servers and/or other computers, and/or the like.

As another example, in various embodiments one or more servers and/or other computers, and/or the like might act to receive, store, and/or the like service parameters and to provide some or all of the service parameters to the user device, and the user device could receive, store, and/or the like location-appropriate service listings data, channel listings data, and/or the like, and provide one or more location-appropriate service listings, channel listings, and/or the like to its user. Determination of the location of the user device might, for instance, be performed by both or either of the user device and the one or more servers and/or other computers, and/or the like.

As still another example, in various embodiments the user device might act to receive, store, and/or the like service parameters and to provide some or all of the service parameters to the one or more servers and/or other computers, and/or the like. In turn, the one or more servers and/or other computers, and/or the like might act to receive, store, and/or the like location-appropriate service listings data, channel listings data, and/or the like, and to provide some or all of the service listings data, channel listings data, and/or the like to the user device. The user device might, in turn, provide location-appropriate service listings, channel listings, and/or the like to its user. Determination of the location of the user device might, for instance, be performed by both or either of the user device and the one or more servers and/or other computers, and/or the like.

Various other distributions of operations among a user device and one or more servers and/or other computers, and/or the like are possible. It is further noted that various of the operations described above as being performed by one or more servers and/or other computers, and/or the like may be performed by one or more user devices and/or the like such that, for example, a first user device might act to receive, store, and/or the like service parameters, to receive, store, and/or the like location-appropriate service listings data, channel listings data, and/or the like, and to provide some or all of the service parameters and the service listings data, channel listings data, and/or the like to a second user device. The user device could, in turn, provide one or more location-appropriate service listings, channel listings, and/or the like to a user.

Moreover, it is noted that, in various embodiments, peer-to-peer and/or grid computing techniques might be employed.

Hardware and Software

Various operations and/or the like described herein may be executed by and/or with the help of computers. Further, for example, devices described herein may be and/or may incorporate computers. The phrases "computer", "general purpose computer", and the like, as used herein, refer but are not limited to a smart card, a media device, a personal computer, an engineering workstation, a PC, a Macintosh, a PDA, a portable computer, a computerized watch, a wired or wireless terminal, a mobile communication device, phone, node, and/or the like, a server, a network access point, a network multicast point, a set-top box, a personal video recorder (PVR), a radio (e.g., a digital radio), a television (e.g., a digital television), a portable television, a game console, or the like, perhaps running an operating system such as OS X, Linux, Darwin, Windows CE, Windows XP, Windows Server 2003, Palm OS, Symbian OS, or the like, perhaps employing the Series 40 Platform, Series 60 Platform, and/or Series 90 Platform, and perhaps having support for Java and/or Net.

Figure 5:
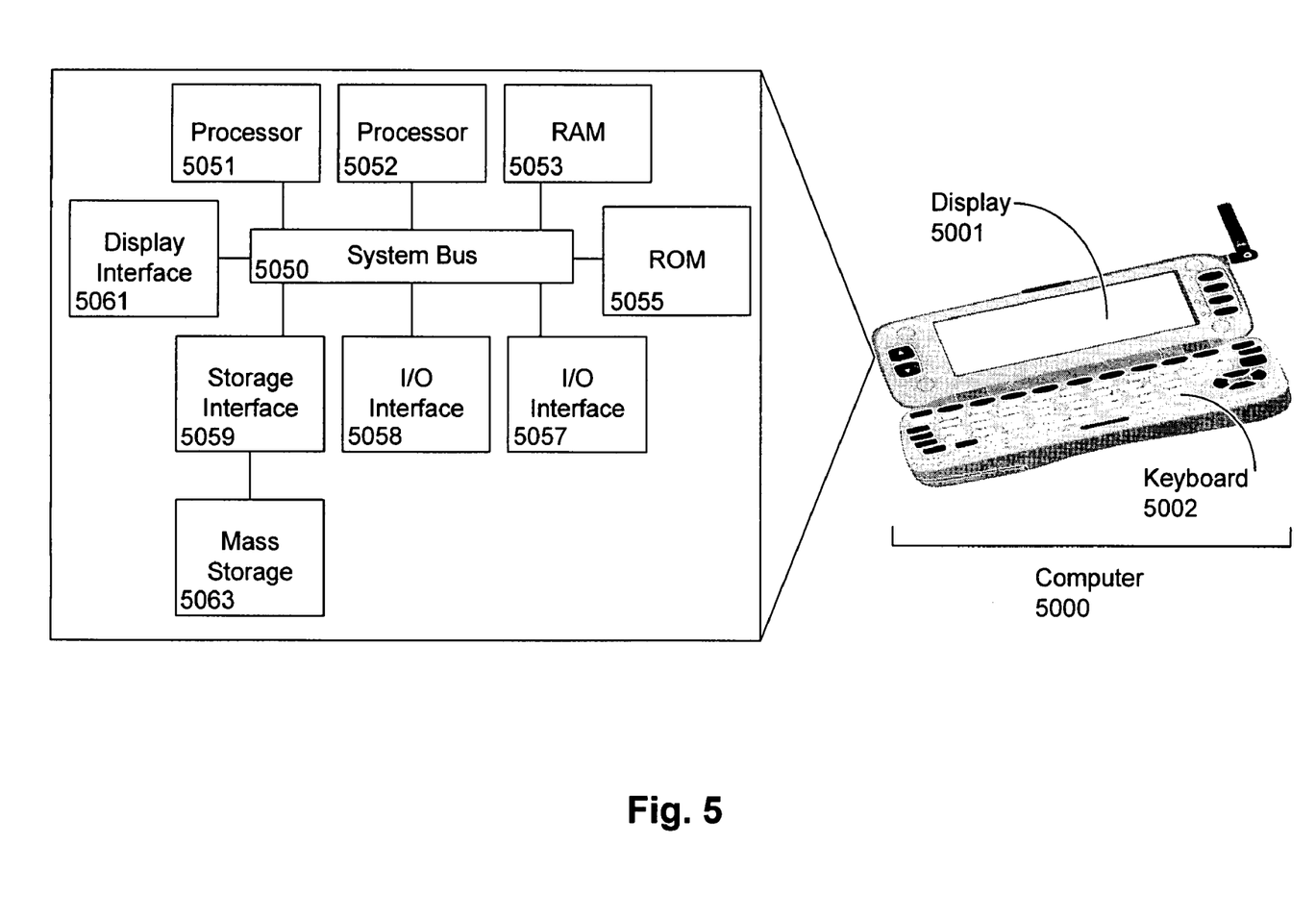
FIG. 5 shows an exemplary computer.

The phrases "general purpose computer", "computer", and the like also refer, but are not limited to, one or more processors operatively connected to one or more memory or storage units, wherein the memory or storage may contain data, algorithms, and/or program code, and the processor or processors may execute the program code and/or manipulate the program code, data, and/or algorithms. Accordingly, exemplary computer 5000 as shown in FIG. 5 includes system bus 5050 which operatively connects two processors 5051 and 5052, random access memory 5053, read-only memory 5055, input output (I/O) interfaces 5057 and 5058, storage interface 5059, and display interface 5061. Storage interface 5059 in turn connects to mass storage 5063. Each of I/O interfaces 5057 and 5058 may, for example, be an Ethernet, IEEE 1394, IEEE 1394b, IEEE 802.11a, IEEE 802.11b, IEEE 802.11g, IEEE 802.11i, IEEE 802.11e, IEEE 802.11n, IEEE 802.15a, IEEE 802.16a, IEEE 802.16d, IEEE 802.16e, IEEE 802.16x, IEEE 802.20, IEEE 802.15.3, ZigBee, Bluetooth, wireless universal serial bus (WUSB), wireless Firewire, terrestrial digital video broadcast (DVB-T), satellite digital video broadcast (DVB-S), DVB-H (Digital Video Broadcasting: Handhelds), Digital Audio Broadcast (DAB), satellite radio, Digital Radio Mondial (DRM), Digital Audio Broadcasting (DAB), amplitude modulation (AM) radio, frequency modulation (FM) radio, television, satellite television, digital cable television, Phase Alternating Line (PAL) television, National Television Standards Committee (NTSC) television, wireless telecommunication network, General Packet Radio Service (GPRS), Universal Mobile Telecommunications Service (UMTS), Global System for Mobile Communications (GSM), IRDA (Infrared Data Association), and/or other interface.

Mass storage 5063 may be a hard drive, optical drive, or the like. Processors 5051 and 5052 may each be a commonly known processor such as an IBM or Motorola PowerPC, an AMD Athlon, an AMD Opteron, an Intel ARM, an Intel XScale, a Transmeta Crusoe, a Transmeta Efficeon, an Intel Xenon, an Intel Itanium, or an Intel Pentium. Computer 5000 as shown in this example also includes a touch screen 5001 and a keyboard 5002. In various embodiments, a mouse, keypad, and/or interface might alternately or additionally be employed. Computer 5000 may additionally include or be attached to card readers, DVD drives, floppy disk drives, hard drives, memory cards, ROM, and/or the like whereby media containing program code (e.g., for performing various operations and/or the like described herein) may be inserted for the purpose of loading the code onto the computer.

Additionally, the computer 5000 may include (not shown) one or more location detection or satellite navigation system devices and means, such as a global positioning system (GPS). In accordance with various embodiments of the present invention, the computer 5000 may be additionally equipped with an internet protocol datacasting (IPDC) or a time-sliced internet protocol datacasting (DVB-H) receiving means and devices. The computer may include (not shown) one or more decoders for decoding the datacasting signals, such as video, audio and data streams, and one or more buffer memories for storing the decoded datacast signal before presentation or utilization of it.

In accordance with various embodiments of the present invention, a computer may run one or more software modules designed to perform one or more of the above-described operations. Such modules might, for example, be programmed using languages such as Java, Objective C, C, C#, C++, Perl, and/or Xen according to methods known in the art. Corresponding program code might be placed on media such as, for example, DVD, CD-ROM, and/or floppy disk. It is noted that any described division of operations among particular software modules is for purposes of illustration, and that alternate divisions of operation may be employed. Accordingly, any operations discussed as being performed by one software module might instead be performed by a plurality of software modules. Similarly, any operations discussed as being performed by a plurality of modules might instead be performed by a single module. It is noted that operations disclosed as being performed by a particular computer might instead be performed by a plurality of computers. It is further noted that, in various embodiments, peer-to-peer and/or grid computing techniques may be employed.

Figure 6:
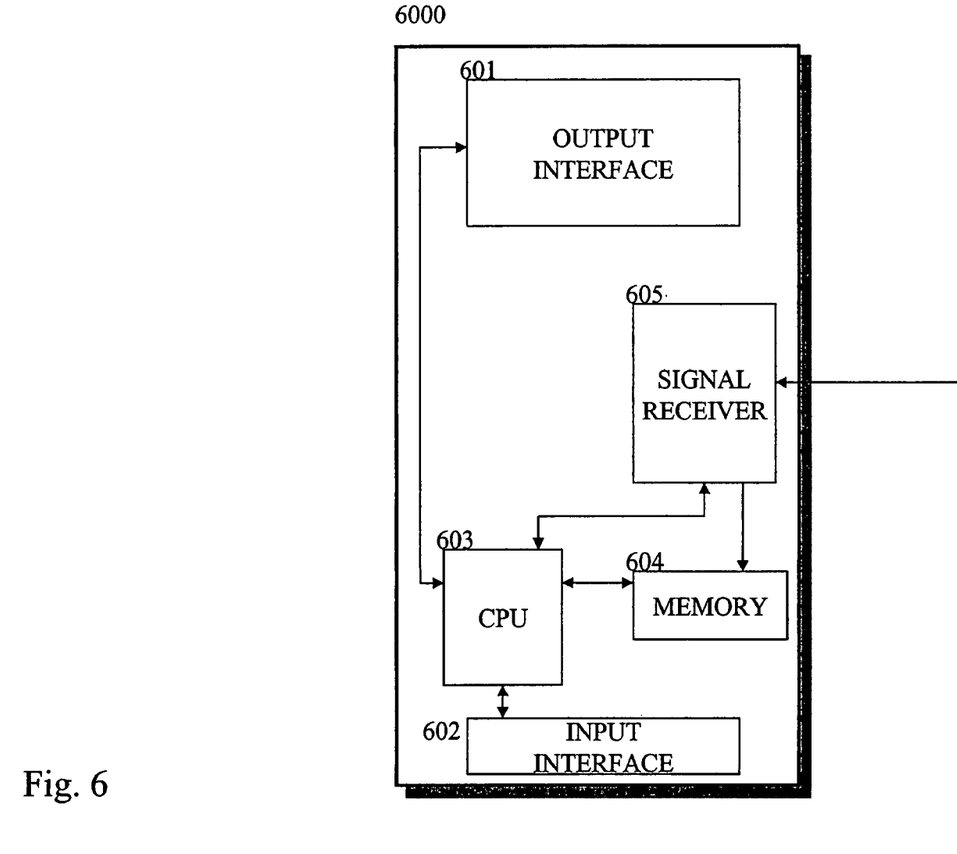
FIG. 6 shows a further exemplary computer.

Shown in FIG. 6 is a block diagram of a terminal 6000, an exemplary computer employable in various embodiments of the present invention. The terminal 6000 may be implemented by or connected to the computer 5000. In the following, corresponding reference signs are applied to corresponding parts. Exemplary terminal 6000 of FIG. 6 comprises a processing unit CPU 603, a signal receiver 605, and a user interface (601, 602). Signal receiver 605 may, for example, be a single-carrier receiver or multi-carrier receiver. Signal receiver 605 and the user interface (601, 602) are coupled with the processing unit CPU 603. One or more direct memory access (DMA) channels may exist between signal receiver 605 and memory 604. The user interface (601, 602) comprises a display and a keyboard to enable a user to use the terminal 6000. In addition, the user interface (601, 602) comprises a microphone and a speaker for receiving and producing audio signals. The user interface (601, 602) may also comprise voice recognition (not shown).

The processing unit CPU 603 comprises a microprocessor (not shown), memory 604 and possibly software. The software can be stored in the memory 604. The microprocessor controls, on the basis of the software, the operation of the terminal 6000, such as receiving of a data stream, tolerance of the impulse burst noise in data reception, displaying output in the user interface and the reading of inputs received from the user interface. The hardware contains circuitry for detecting signal, circuitry for demodulation, circuitry for detecting impulse, circuitry for blanking those samples of the symbol where significant amount of impulse noise is present, circuitry for calculating estimates, and circuitry for performing the corrections of the corrupted data.

Still referring to FIG. 6, alternatively, middleware or software implementation can be applied. The terminal 6000 can, for instance, be a hand-held device which a user can comfortably carry. The terminal 6000 can be, for example, a cellular mobile phone or a portable or mobile TV that comprises the signal receiver 605 for receiving the multicast transmission stream. Therefore, the terminal 6000 may possibly interact with the service providers.

Exemplary System

Figure 7:
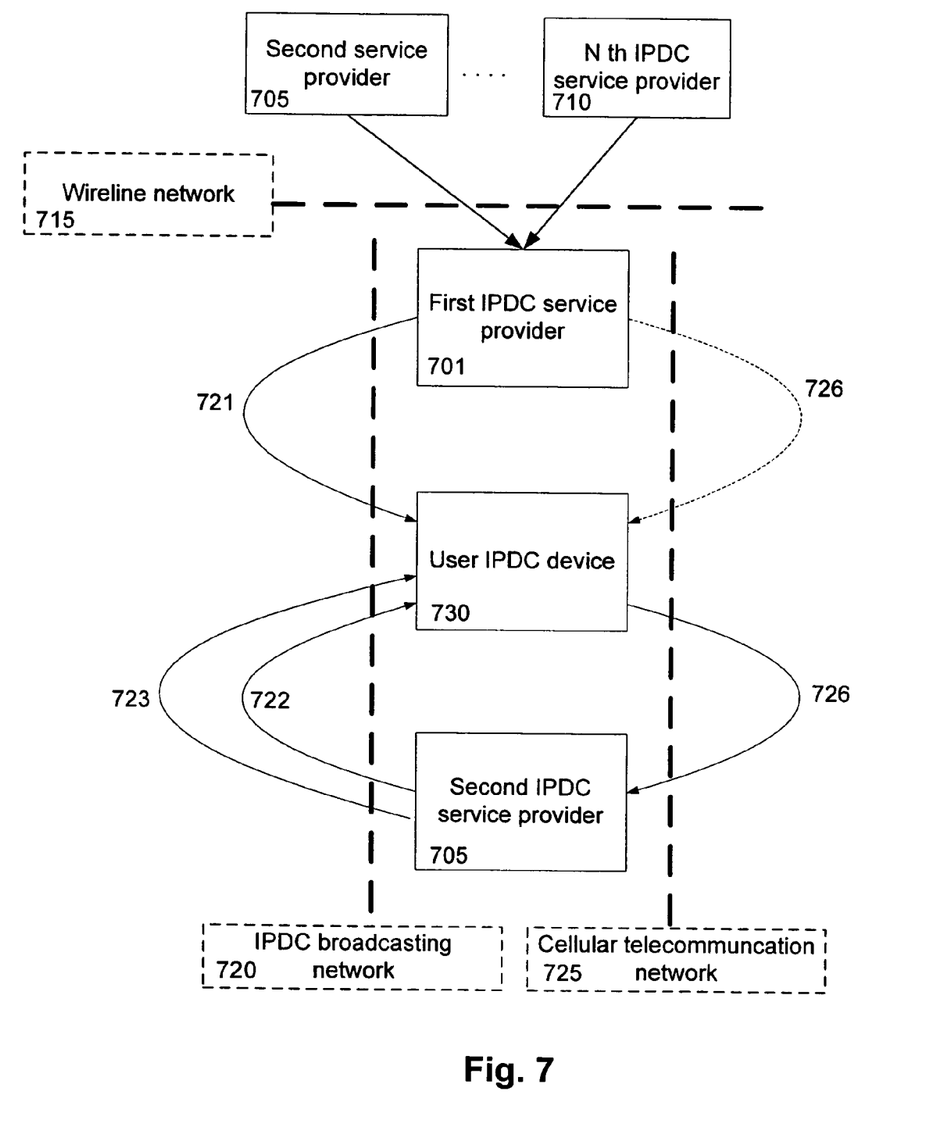
FIG. 7 shows an exemplary embodiment of an entire system according to the present invention.

FIG. 7 shows an exemplary system in accordance with aspects of the present invention. Initially, a first IPDC service provider 701 collects service parameters from any number of other IPDC service providers 705, 710, via a wireline network 715. The first IPDC service provider can then send the collected service parameters to its constituent users, such as user IPDC device 730. This transmission from the first IPDC service provider to the user IPDC device takes place via an IPDC broadcasting network 720, as shown by transmission path 721. Alternatively, the transmission to the user IPDC device could occur as a result of a user request over cellular telecommunication network 725, as shown by transmission path 726.

After receiving the collection of service parameters from the first IPDC service provider, the user IPDC device 730 can move to any of the service areas identified by the collection service parameters and receive service listings. For example, if the user IPDC device moves to the service area of the second IPDC service provider 705, it can compare its current location to the saved service parameters and identify that it should request service listings from the second service IPDC provider.

The user IPDC device can then use the service parameters to format and send a request for service listing data to the second IPDC provider via the cellular network, transmission path 726. In response, the second IPDC service provider will send service listing data to the user IPDC device via the IPDC broadcasting network, transmission path 722. The user can then review the service listing data and select a service or program from the list. The user IPDC device will then receive the service/program over the IPDC broadcasting network, transmission path 723.

RAMIFICATIONS AND SCOPE

Although the description above contains many specifics, these are merely provided to illustrate the invention and should not be construed as limitations of the invention's scope. Thus it will be apparent to those skilled in the art that various modifications and variations can be made in the system and processes of the present invention without departing from the spirit or scope of the invention.

In addition, the embodiments, features, methods, systems and details of the invention that are described above in the application may be combined separately or in any combination to create or describe new embodiments of the invention.

What is claimed is:
1. A method comprising:
    receiving and storing at a first location of a wireless device one or more service parameters corresponding to one or more locations;
    determining a second location of the wireless device, wherein the second location is different from the first location;
    selecting one or more of the stored service parameters based on the second location;
    determining to transmit, from the second location over a wireless communication network deploying the selected one or more service parameters, a request for service listing data; and
    receiving the service listing data corresponding to the second location.
2. The method of claim 1, further comprising:
    presenting the received service listing data based on user preferences, wherein the service parameters include the user preferences relating to the service listing data.
3. The method of claim 1, wherein at least some of the service parameters to which the device has access are received prior to the device accessing a service associated with the current location.
4. The method of claim 1, wherein at least some of the service parameters to which the device has access are possessed by way of the device being set to operate in a certain area.

5. The method of claim 1, wherein at least some of the service parameters to which the device has access are received while the device is accessing a service associated with the current location.

6. The method of claim 1, wherein at least some of the service parameters to which the device has access are received via internet protocol datacast.

7. The method of claim 1, wherein at least some of the service parameters to which the device has access are received via universal mobile telecommunications service.

8. The method of claim 1, wherein only services corresponding to a subscription are displayed.

9. The method of claim 1, wherein services are displayed in an order corresponding to user preference.

10. The method of claim 1, wherein a position detector, a network cell identifier, a global positioning system receiver, or a combination thereof, is employed in determining the current location of the device.

11. The method of claim 1, wherein the service listing data comprises one or more of program broadcast schedules, channel listings data, program guide data, and service guide data.

12. The method of claim 1, wherein the wireless communication network is a cellular communication network, and the one or more deployed service parameters include data regarding one or more network parameters of the cellular communication network.

13. The method of claim 12, wherein the network parameters include network identifiers, network names, network information table versions, signal lists, platform lists, or a combination thereof.

14. The method of claim 1, wherein the one or more of the service parameters are selected based on the second location without user intervention.

15. The method of claim 1, wherein the one or more service parameters, the service listing data corresponding to the second location, or a combination thereof, are received via a broadcast network, the wireless communication network, or a combination thereof.

16. The method of claim 1, wherein the one or more received and stored service parameters include service area information, service provider names, network parameters, identifiers for subscription, channel package information, or a combination thereof.

17. The method of claim 1, further comprising:
determining the second location by employing a position detector, a network cell identifier, a global positioning system receiver, or a combination thereof.

18. The method of claim 1, wherein the first location is a home service area, and the second location is non-home service area.

19. An apparatus comprising:
at least one processor; and
at least one memory including computer program code,
the at least one memory and the computer program code configured to, with the at least one processor, cause the apparatus to perform at least the following,
receive and store at a first location of a wireless device one or more service parameters corresponding to one or more locations;
determine a second location of the wireless device, wherein the second location is different from the first location;
select one or more of the stored service parameters based on the second location;
determine to transmit, from the second location over a wireless communication network deploying the selected one or more service parameters, a request for service listing data; and
receive the service listing data corresponding to the second location.

20. The wireless device of claim 19, wherein the service parameters include user preferences relating to the service listing data.

21. The wireless device of claim 19, wherein at least some of the service parameters to which the device has access are received prior to the device accessing a service associated with the current location.

22. A non-transitory computer-readable storage medium carrying one or more sequences of one or more instructions which, when executed by one or more processors, cause an apparatus to at least perform the following steps:
receiving and storing at a first location of a wireless device one or more service parameters corresponding to one or more locations;
determining a second location of the wireless device, wherein the second location is different from the first location;
selecting one or more of the stored service parameters based on the second location;
determining to transmit, from the second location over a wireless communication network deploying the selected one or more service parameters, a request for service listing data; and
receiving the service listing data corresponding to the second location.

23. The non-transitory computer-readable storage medium of claim 22, wherein at least some of the service parameters to which the device has access are received prior to the device accessing a service associated with the current location.

* * * * *